Patented Dec. 20, 1949

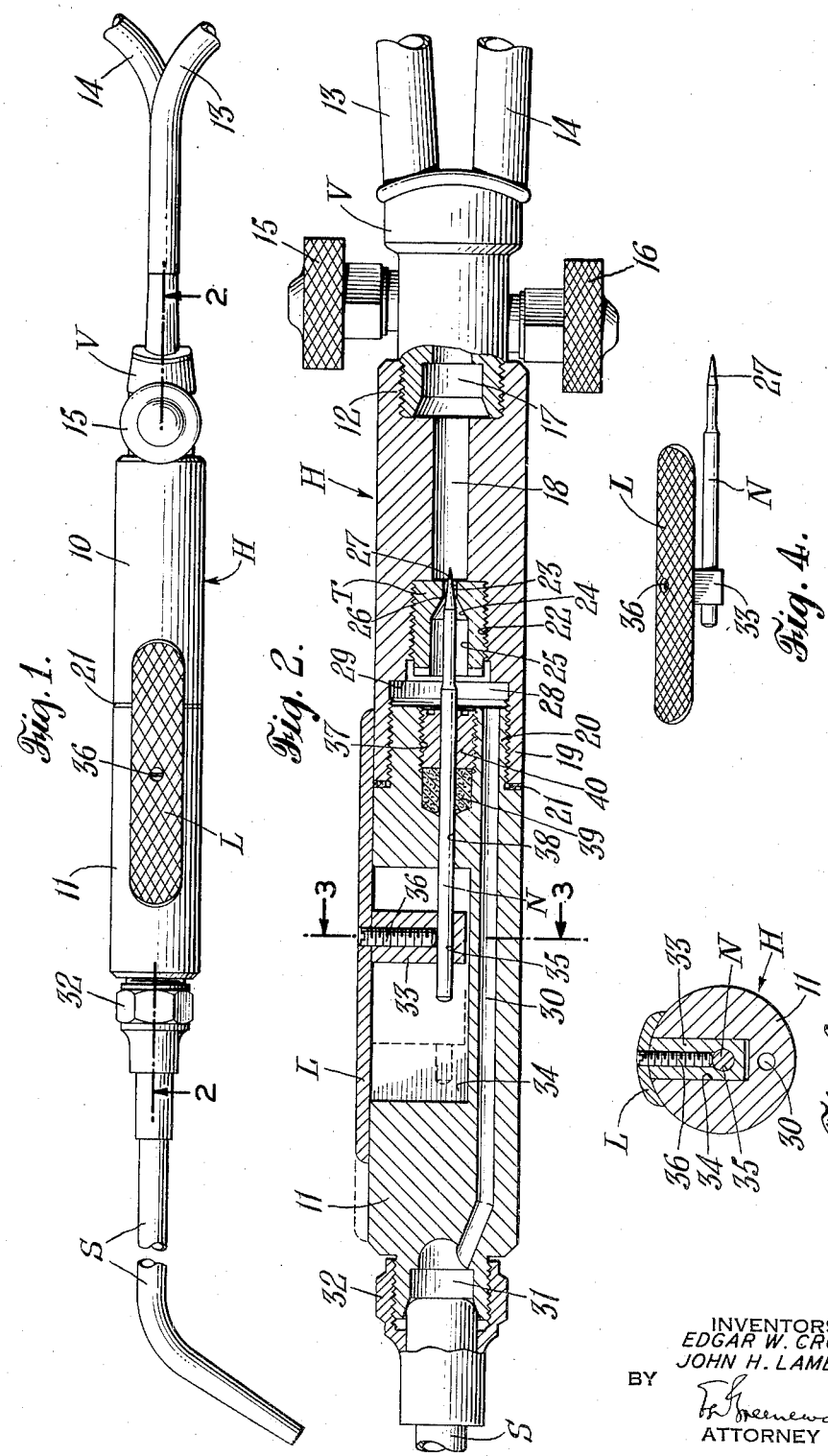

2,491,648

UNITED STATES PATENT OFFICE 2,491,648

TORCH WITH ADJUSTABLE GAS MIXTURE FLOW CONTROL MEANS

Edgar W. Crow, Manhattan Beach, and John H. Lambert, Los Angeles, Calif., assignors, by mesne assignments, to The Linde Air Products Company, a corporation of Ohio Application May 7, 1946, Serial No. 667,800

11 Claims. (Cl. 158—27.4)

This invention relates to oxy-fuel gas torches, and particularly to adjustable welding torches wherein the flame size may be varied without changing the oxy-fuel gas ratio of the mixture that produces the flame.

During the process of welding light-gauge metals such as aluminum, heavier sections are occasionally encountered which require more heat than is being supplied to the lighter sections. Unless some means is provided whereby the oxy-fuel gas ratio of the mixture is not disturbed while increasing the flame size considerable time is lost in manipulating the oxygen and fuel gas valves in order to restore the proper ratio of such gases for a correct welding flame, resulting in inferior welding due to the interruption in the welding process. Furthermore, in making the last few inches of a weld, convenient flame-size adjustment is desirable as the heat is usually excessive in this area due to the relatively slow conduction of heat from the welding area to the restricted plate area and rather than stop welding to reduce the flame size, it has been heretofore customary for the operator to draw the torch flame away from the work. Such action is undesirable because in the welding of heavier sections it may not be possible to impart ample heat to the work in a relatively short time to restore the welding temperature necessary for continuous welding. Moreover, contamination by the surrounding atmosphere is eliminated when a metal surface is covered continually with a flame.

Accordingly, the principal objects of the present invention are: to provide an improved torch having a throttle valve for conveniently regulating the flow of mixed-gases therethrough; to provide an efficient and effective slide mechanism for operating the throttle; and to provide a simple torch construction in which such throttle valve and slide mechanism may be economically manufactured, easily assembled and compactly arranged.

According to the invention a torch is provided which comprises a needle valve directly connected to a slide for setting the valve relatively to a port to regulate the flow of a mixture of combustible and combustion supporting gases through the port so that the flame size may be adjusted without disturbing the ratio of combustible gas to combustion supporting gas, which ratio it is desirable to maintain substantially constant.

Other objects and the novel feature will be apparent from the description of the invention which follows when considered in conjunction with the accompanying drawing, in which:

Fig. 1 is a side view of a torch embodying the invention;

Fig. 2 is an enlarged central longitudinal sectional view, taken on line 2—2 of Fig. 1;

Fig. 3 is a transverse section taken on line 3—3 of Fig. 2; and

Fig. 4 is a view illustrating the needle valve connected to the slide.

As shown, the improved torch comprises an elongated handle H which carries a valve body V at its rear end and a hollow welding stem or tip S at its front end. The handle H includes a gas inlet section 10 and a gas outlet section 11. The inlet section 10 has an end 12 internally threaded to receive the threaded end of the Y-shaped valve body V which is provided with diverging couplings 13 and 14 for the attachment of the usual hoses for supplying fuel gas, such as hydrogen, and combustion supporting gas, such as oxygen, respectively. Main valves 15 and 16 are mounted on opposite sides of the valve body V to control the flow of the fuel gas and oxygen into a common passage 17 leading to a gas mixing chamber 18 in the handle section 10, and to initially adjust the supplies of the two gases to provide the desired ratio of these gases in the combustible mixture discharged from the stem S.

The front end of the handle section 10 has an internally threaded skirt 19 to receive the reduced and externally threaded rear end 20 of the handle section 11, to couple the sections 10 and 11 together end to end. A gasket 21 clamped between the sections 10 and 11 prevents leakage of gas to the atmosphere.

Centrally within the front end of the handle section 10 there is an internally threaded cavity 22 to receive an externally threaded seat member T which has a passage extending axially therethrough and consisting of a port 23, a forwardly flaring passage portion 24, and an enlarged passage portion 25. The port 23 communicates directly with the chamber 18, and the edge 26 common to the port 23 and the flaring portion 24 constitutes a seat for the tapering end 27 of the needle valve N which extends into the port 23 and is operable to control the flow of the gas mixture from the chamber 18 through the port 23 into the passage portions 24 and 25. The passage portion 25 opens directly into a chamber 28 formed between the rear end 29 of the handle section 11 and a shoulder 29 surrounding the cavity 22 in the handle section 10. From the chamber 28, the gas mixture is delivered, via a passage 30 extending lengthwise of the handle section 11, to a socket 31 in the front end of the handle section 11. The socket 31 gastightly fits the rear end of the stem S that is coupled to the handle section 11 by a nut 32.

The needle valve N is adjustable axially relatively to the port 23 and the seat 26 by an elongated slide L that engages and is slidable lengthwise of the outer alined cylindrical surfaces of the handle sections 10 and 11. A stud 33, that is substantially rectangular in cross-section, is secured to the inner side of the slide L midway of its length. The stud 33 extends into and slidably engages the side walls of an elongated substantially rectangular slot or recess 34 formed in the upper side of the handle section 11. Adjacent its inner end, the stud 33 has a transverse bore 35 through which the stem or rear end of the needle valve N extends. The needle valve N may be secured in any selected position relatively to the stud 33 by a set screw 36 which extends through the slide L and the stud 33 into the bore 35 in the latter. The slide L is sufficiently longer and wider than the slot 34 to completely cover and conceal the slot in all adjusted positions of the slide.

Suitable means are provided between the slot 34 and the port 23 to guide the needle valve N and to prevent gas leakage from the chamber 28 into the slot 34 and out of the torch. As shown, at the rear end of the handle section 11 there is an internally threaded cavity 37 which is connected at its bottom to the rear end of the slot 34 by a bore 38. The needle valve N slidably fits the bore 38, and both the cavity 37 and the bore 38 are axially alined with the port 23 and with the bore 35 in the stud 33. Suitable packing material 39 is inserted in the bottom of the cavity 37 and is pressed against both the needle valve N and the wall of this cavity by an externally threaded plug 40 that engages the threaded wall of the cavity 37. The needle valve N extends through and is slidably guided by an axial bore 41 in the plug 40. Thus, the plug 40 is adjustable to compress the packing 39 to prevent gas leakage past the valve and also to provide friction to assist in retaining the valve N and the slide L in any one of their adjusted positions.

After the valves 15 and 16 have been initially adjusted to provide the desired ratio of fuel gas and oxygen in the mixture to produce the desired type of flame, the flame size may be varied by simply pushing the slide L to change the position of the needle valve N relatively to the port 23, and the flow of the gas mixture may be interrupted, all without manipulating the valves 15 and 16.

It will be understood that various changes may be made in the structural details of the torch as disclosed herein without departing from the principles and scope of this invention as set forth in the appended claims.

What is claimed is:

1. In a torch, the combination comprising means for mixing a combustible gas and a combustion supporting gas to form a gas flame in which the ratio of combustible gas to combustion supporting gas is substantially constant, and means for varying the size of such flame without disturbing such ratio comprising a mixed-gas port communicating with such mixing means, an adjustable valve controlling said port, an outlet passage means receiving mixed gas from said port when said valve is opened, and means for adjusting said valve relatively to said port to vary the flow of mixed gas from said mixing means to said outlet passage means.

2. In a torch, the combination comprising means for mixing a combustible gas and a combustion supporting gas to form a gas flame in which the ratio of combustible gas to combustion supporting gas is substantially constant, and means for varying the size of such flame without disturbing such ratio comprising a mixed-gas port communicating with such mixing means, an outlet passage means receiving mixed gas from said port, and a needle valve extending into and movable axially relatively to said port for varying the flow of mixed gas from said mixing means to said outlet passage means.

3. In a torch, the combination comprising means for mixing a combustible gas and a combustion supporting gas to form a gas flame in which the ratio of combustible gas to combustion supporting gas is substantially constant, and a handle having therein a mixed-gas passage provided with a port communicating with such mixing means, a needle valve in said handle and movable axially relatively to said port, and a slide movably mounted on the outside of said handle and connected to said needle valve for moving said needle valve longitudinally in said handle to vary the flow of mixed-gas from said mixing means through said port, into said mixed-gas passage.

4. A torch comprising, in combination, means for mixing a combustible gas and a combustion supporting gas to form a gas flame in which the ratio of combustible gas to combustion supporting gas is substantially constant, and an elongated hollow handle having therein a mixed-gas passage provided with a port communicating with such mixing means, a valve within said handle and movable relatively to said port to vary the flow of mixed-gas therethrough and a manually-operable valve-actuating device adjacent the outside surface of said handle and connected to said valve for varying the rate of mixed-gas flow through said port into said mixed-gas passage.

5. A torch comprising, in combination, a handle having a mixing chamber therewithin provided with respective inlets for a combustible gas and a combustion supporting gas, to form a mixed gas, said handle having a port communicating with said chamber, a needle valve axially alined with and controlling said port and longitudinally slidable in said handle toward and away from said port, a thumb-controlled slide conforming in shape to and engaging the outside surface of said handle and movable longitudinally thereof in opposite directions, said needle valve being operable by said slide to vary the amount of mixed-gas flowing from said chamber through said port in accordance with the longitudinal adjustment of said slide without disturbing the ratio of the combustible gas to the combustion supporting gas in such mixed-gas.

6. A torch comprising, in combination, a handle having therein a combustible gas mixture passage including a port between the ends of said passage, main valves for separately controlling the flow of a combustible gas and a combustion supporting gas into said passage ahead of said port, a needle valve within said handle and longitudinally movable within said passage toward and away from said port to control the flow of such gas mixture through said port, and a finger-controlled valve-actuating slide engaging the outside surface of said handle and rigidly secured to said needle valve so that longitudinal displacement of said slide will cause equal axial displacement of said needle valve relatively to said port to vary the flow of such combustible mixture through said passage without disturbing either of said main valves or the ratio of the combustible gas to the combustion supporting gas in said mixture.

7. In a torch, a handle comprising two sections coupled together end to end, one of said sections having a gas mixing chamber therein and a discharge port for said mixing chamber, the other of said sections having a gas mixture outlet passage, and means for controlling the flow of gas mixture through said port to said outlet passage, such controlling means comprising a movable valve carried by the other of said sections and means for moving said valve toward and away from said port.

8. In a torch as claimed in claim 7, said valve constituting a needle valve guided in the other of said sections of the handle, and said moving means for said valve comprising a stud within the other of said sections and connected to said needle valve and a slide connected to said stud and slidable along the outside surfaces of said handle sections.

9. In a torch as claimed in claim 7, the first-named handle section having therein a removable valve seat member containing said port, said valve constituting a needle valve operable to engage said valve seat member adjacent said port to control the flow of gas mixture through said port, the second-named handle section having therein a packing around said valve and an adjustable bore plug to guide said needle valve and to apply pressure against said packing.

10. In a torch as claimed in claim 7, wherein the second-named handle section has a longitudinal slot, said valve comprises a needle valve having a part extending into said slot, and the means for moving such needle valve comprises a stud slidable lengthwise of said slot and secured to said part of the needle valve, and a manually-operable slide secured to said stud and closing the open side of said slot.

11. In a torch, in combination, a handle comprising front and rear sections detachably coupled together end to end, the rear handle section having therein a gas mixing chamber and a forwardly-facing cavity, and the front handle section having a longitudinal slot, a rearwardly-facing cavity and a bore between said slot and said rearwardly-facing cavity, a valve body secured to said rear section and having separate inlets for combustible gas and combustion supporting gas, main valves on said valve body operable to control the gas flow from said inlets to said mixing chamber to provide therein a gas mixture containing a desired ratio of the combustible gas to the combustion supporting gas, a valve seat member in said forwardly-facing cavity having a port opening into said mixing chamber, and control means operable to control the flow of such gas mixture through said port and to vary the size of the torch flame without manipulating said main valves or changing said ratio, said control means comprising a needle valve operable to engage said valve seat member adjacent said port and having a stem extending forwardly through said cavities and said bore into said slot, a packing around said stem in said rearwardly-facing cavity, a plug in said rearwardly-facing cavity pressing against said packing, a slide movable in opposite directions along and engaging the outer surfaces of said handle sections and covering said slot, a stud secured to said slide and projecting into said slot, and means securing said needle valve to said stud within said slot.

EDGAR W. CROW.
JOHN H. LAMBERT.

REFERENCES CITED

The following references are of record in the file of this patent:

UNITED STATES PATENTS

| Number | Name | Date |
|---|---|---|
| 913,516 | Lake | Feb. 23, 1909 |
| 1,154,868 | McHenry | Sept. 28, 1915 |
| 1,162,199 | Winans | Nov. 30, 1915 |
| 1,404,011 | Coberly | Jan. 17, 1922 |
| 1,428,530 | Cassidy | Sept. 12, 1922 |
| 1,639,450 | Bastian et al. | Aug. 16, 1927 |
| 1,740,669 | Shaff | Dec. 24, 1929 |
| 1,810,158 | Campbell | June 16, 1931 |
| 1,830,067 | Mellers et al. | Nov. 3, 1931 |
| 2,170,793 | Carroll | Aug. 29, 1939 |
| 2,376,265 | Meredith | May 15, 1945 |

FOREIGN PATENTS

| Number | Country | Date |
|---|---|---|
| 121,950 | Germany | Aug. 1901 |